United States Patent
Li (10) Patent No.: US 12,446,085 B2
(45) Date of Patent: Oct. 14, 2025

(54) METHOD FOR WIRELESS COMMUNICATION, AND COMMUNICATION DEVICE

(71) Applicant: BEIJING XIAOMI MOBILE SOFTWARE CO., LTD., Beijing (CN)

(72) Inventor: Mingju Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 394 days.

(21) Appl. No.: 17/784,583

(22) PCT Filed: Dec. 13, 2019

(86) PCT No.: PCT/CN2019/125344
§ 371 (c)(1),
(2) Date: Jun. 10, 2022

(87) PCT Pub. No.: WO2021/114274
PCT Pub. Date: Jun. 17, 2021

(65) Prior Publication Data
US 2023/0007714 A1    Jan. 5, 2023

(51) Int. Cl.
*H04W 76/15*   (2018.01)
*H04W 24/10*   (2009.01)
*H04W 72/044*  (2023.01)
*H04W 72/0446* (2023.01)
*H04W 72/23*   (2023.01)
*H04W 76/20*   (2018.01)
*H04W 80/02*   (2009.01)

(52) U.S. Cl.
CPC ......... *H04W 76/15* (2018.02); *H04W 24/10* (2013.01); *H04W 72/0446* (2013.01); *H04W 72/046* (2013.01); *H04W 72/23* (2023.01); *H04W 76/20* (2018.02); *H04W 80/02* (2013.01)

(58) Field of Classification Search
None
See application file for complete search history.

(56) References Cited

U.S. PATENT DOCUMENTS

| | | | |
|---|---|---|---|
| 2018/0279145 A1* | 9/2018 | Jung | H04L 5/0051 |
| 2019/0239212 A1 | 8/2019 | Wang et al. | |
| 2019/0281587 A1* | 9/2019 | Zhang | H04W 72/23 |
| 2019/0335491 A1* | 10/2019 | Venugopal | H04L 5/0082 |

(Continued)

FOREIGN PATENT DOCUMENTS

| | | |
|---|---|---|
| CN | 109076560 A | 12/2018 |
| CN | 109983797 A | 7/2019 |

(Continued)

OTHER PUBLICATIONS

Indian Patent Application No. 202247038926, Office Action dated Oct. 21, 2022, 5 pages.

(Continued)

*Primary Examiner* — Benjamin Lamont
(74) *Attorney, Agent, or Firm* — Cozen O'Connor (57) ABSTRACT

A method for wireless communication is performed by a terminal having a plurality of antenna panels, and includes: respectively communicating with a first cell and a second cell by different antenna panel, in which the first cell is a service cell of the terminal, and the second cell is a cell other than a service cell of the terminal.

17 Claims, 4 Drawing Sheets

(56) References Cited

U.S. PATENT DOCUMENTS

| | | | | |
|---|---|---|---|---|
| 2020/0107327 A1* | 4/2020 | Wang | .................. | H04W 72/044 |
| 2020/0107341 A1* | 4/2020 | Zhang | .................. | H04W 72/23 |
| 2020/0351892 A1* | 11/2020 | Yi | ......................... | H04L 5/0092 |
| 2021/0219327 A1* | 7/2021 | Jiang | ..................... | H04L 1/0031 |
| 2021/0306867 A1* | 9/2021 | Hamidi-Sepehr | ..... | H04W 16/28 |
| 2021/0368486 A1* | 11/2021 | Jin | ......................... | H04W 72/23 |
| 2023/0209543 A1* | 6/2023 | Park | ..................... | H04L 5/0094 |
| | | | | 370/329 |

FOREIGN PATENT DOCUMENTS

| | | |
|---|---|---|
| CN | 110224802 A | 9/2019 |
| CN | 110535590 A | 12/2019 |
| WO | WO 2018232294 A1 | 12/2018 |

OTHER PUBLICATIONS

Chinese Patent Application No. 201980003573.0, Office Action dated Jan. 6, 2022, 9 pages.
Chinese Patent Application No. 201980003573.0, English translation of Office Action dated Jan. 6, 2022, 11 pages.
European Patent Application No. 19955689.5, Search and Opinion dated Jul. 19, 2023, 9 pages.
PCT/CN2019/125344 English translation of International Search Report dated Aug. 28, 2020, 2 pages.

* cited by examiner

FIG. 1 communicating with a first cell and a second cell respectively by different antenna panels, wherein the first cell is a serving cell of the terminal, and the second cell is not the serving cell of the terminal.  S110

METHOD FOR WIRELESS COMMUNICATION, AND COMMUNICATION DEVICE

CROSS-REFERENCE TO RELATED APPLICATION

This application is the U.S. national application of International Application No. PCT/CN2019/125344, filed on Dec. 13, 2019, the entire contents of which are incorporated herein by reference for all purposes.

BACKGROUND

In new radio (NR), especially in a communication frequency range 2 (i.e., a frequency band above 6 Ghz), since the frequency of the communication frequency range 2 is high, the high frequency may have the characteristics of accelerated channel fading. Beams are usually used for transmission and reception to ensure coverage.

SUMMARY

According to a first aspect of the disclosure, there is provided a method for wireless communication. The method is performed by a terminal with a plurality of antenna panels. The method includes communicating with a first cell and a second cell by respective antenna panels of the plurality of antenna panels, in which the first cell is a serving cell of the terminal, and the second cell is a cell other than the serving cell of the terminal.

According to a second aspect of the disclosure, there is provided a method for wireless communication. The method is performed by a base station of a first cell. The method includes sending communication configuration, in which the communication configuration is configured to instruct a terminal to communicate with the first cell and a second cell by respective antenna panels; the first cell is a serving cell of the terminal; and the second cell is a cell other than the serving cell of the terminal.

According to a third aspect of the embodiments of the disclosure, there is provided a communication device. The device includes a transceiver, a memory, and a processor connected to the transceiver and the memory respectively. The processor is configured to execute computer-executable instructions stored on the memory, so that the method for wireless communication according to the first aspect is implemented.

It should be understood that the above general description and the following detailed description are exemplary and explanatory, and cannot limit the disclosure.

BRIEF DESCRIPTION OF THE DRAWINGS

The drawings here are incorporated into the specification and constitute a part of the specification, show embodiments in accordance with the disclosure, and together with the specification are used to explain the principle of the disclosure.

DETAILED DESCRIPTION

The embodiments may be described in detail in the disclosure, the examples of which are illustrated in the accompanying drawings. When the following description refers to the drawings, unless otherwise indicated, the same numbers in different drawings indicate the same or similar elements. The implementations described in the following embodiments do not represent all implementations consistent with the disclosure. On the contrary, they are merely examples of apparatuses and methods consistent with some aspects of the disclosure as detailed in the appended claims.

The disclosure relates to but not limited to the field of wireless communication technology, in particular to a method and an apparatus for wireless communication, and a storage medium.

The network architecture and service scenarios described in the embodiments of the disclosure are intended to illustrate the technical solutions in the embodiments of the disclosure more clearly, and do not constitute a limitation on the technical solutions according to the embodiments of the disclosure. With the evolution of new business scenarios and the emergence of new business scenarios, the technical solutions according to the embodiments of the disclosure are also applicable to similar technical problems.

Figure 1:
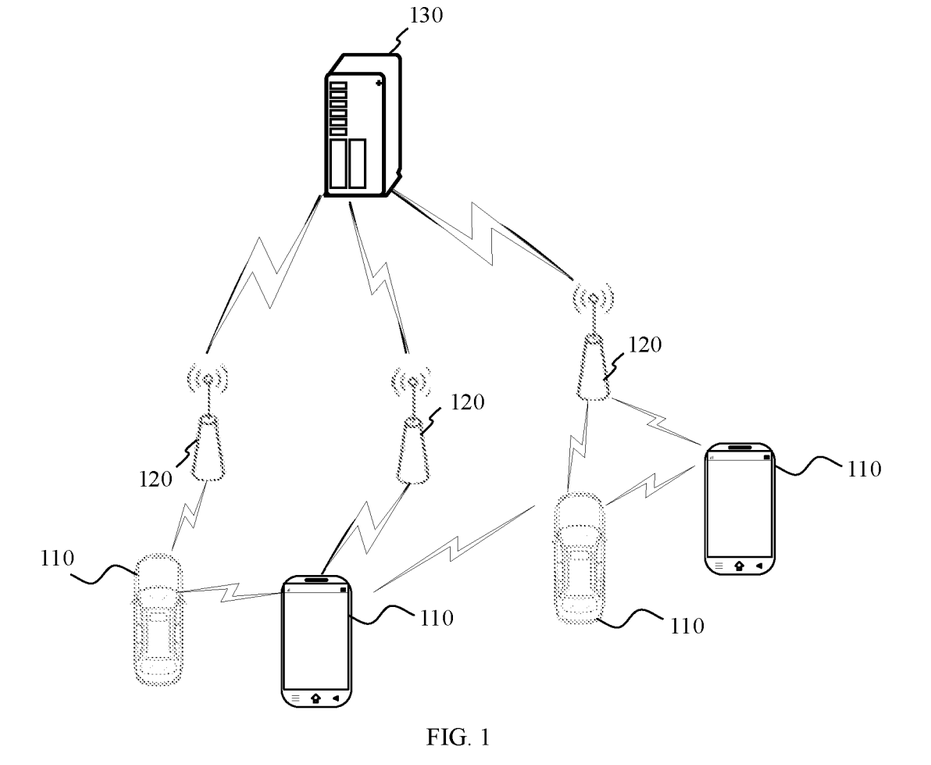
FIG. 1 is a structural schematic diagram of a wireless communication system according to an embodiment.

FIG. 1 shows a structural schematic diagram of a wireless communication system according to an embodiment of the disclosure. As shown in FIG. 1, the wireless communication system is a communication system based on cellular mobile communication technology, and the wireless communication system may include several terminals 110 and several base stations 120.

The terminal 110 may be a device that provides voice and/or data connectivity to a user. The terminal 110 may communicate with one or more core networks via a radio access network (RAN), and the terminal 110 may be an Internet of things (IoT) terminal such as a sensor device, a mobile phone (or a "cellular" phone), and a computer with the IoT terminal. For example, the terminal 110 may be a fixed, portable, pocket, hand-held, built-in computer or a vehicle-mounted apparatus. For example, the terminal 110 may be a station (STA), a subscriber unit, a subscriber station, a mobile station, a mobile, a remote station, an access point, a remote terminal, an access terminal, a user terminal, a user agent, a user device, or a user equipment (UE). Alternatively, the terminal 110 may also be a device of an unmanned aerial vehicle. Alternatively, the terminal 110 may also be a vehicle-mounted device, for example, a trip computer with a wireless communication function, or a wireless communication device connected to the external trip computer. Alternatively, the terminal 110 may also be an infrastructure, for example, a streetlight, a signal light, or other infrastructure with a wireless communication function.

The base station 120 may be a network-side device in a wireless communication system. The wireless communication system may be the 4th generation mobile communication (4G) system, also known as a long term evolution (LTE) system. Alternatively, the wireless communication system may also be a 5G system, also known as new radio (NR) system or 5G NR system. Alternatively, the wireless communication system may also be a next-generation system of the 5G system. The access network in the 5G system may be called a new generation-radio access network (NG-RAN).

The base station 120 may be an evolved base station (eNB) used in the 4G system. Alternatively, the base station 120 may also be a base station (gNB) that adopts a centralized distributed architecture in a 5G system. When the base station 120 adopts the centralized distributed architecture, it usually includes a central unit (CU) and at least two distributed units (DUs). The CU is provided with protocol stacks of a packet data convergence protocol (PDCP) layer, a radio link control (RLC) protocol layer, and a medium access control (MAC) layer. The DU is provided with a protocol stack of a physical (PHY) layer. The specific implementation of the base station 120 is not limited in this embodiment of the disclosure.

A wireless connection may be established between the base station 120 and the terminal 110 through a wireless air interface. In different embodiments, the wireless air interface is a wireless air interface based on the fourth generation mobile communication network technology (4G) standard or a wireless air interface based on the fifth generation mobile communication network technology (5G) standard. For example, the wireless air interface is a new air interface. Alternatively, the wireless air interface may also be a wireless air interface based on a 5G next-generation mobile communication network technology standard.

In some embodiments, an end-to-end (E2E) connection may also be established between the terminals 110, for example, vehicle-to-vehicle (V2V) communication, vehicle to infrastructure (V2I) communication and vehicle to pedestrian (V2P) communication and other communication scenes in vehicle-to-everything (V2X) communication.

In some embodiments, the wireless communication system may further include a network management device 130. In such embodiments, several base stations 120 are connected to the network management device 130. The network management device 130 may be a core network device in a wireless communication system. For example, the network management device 130 may be a mobility management entity (MME) in an evolved packet core (EPC). Alternatively, the network management device may also be other core network devices, such as a serving gateway (SGW), a public data network gateway (PGW), a policy and charging rules function (PCRF) or a home subscriber server (HSS), etc. The implementation of the network management device 130 is not limited in this embodiment of the disclosure.

In the 5G NR system, especially when the communication frequency band is in a frequency range 2 (above 6 GHz), due to fast attenuation of a high-frequency channel, the terminal and the base station need to use beam-based transmission and reception to ensure the coverage. To ensure the coverage, beams are usually used for transmission and reception. In the related art, it is considered that the base station sends information to the terminal by using an antenna panel, and the terminal receives the information sent by the base station by using an antenna panel, which may lead to a problem of insufficient spatial diversity during information transmission.

In embodiments of the disclosure, communication between a terminal and a cell may be understood as communication between the terminal and a base station corresponding to the cell.

Figure 2:
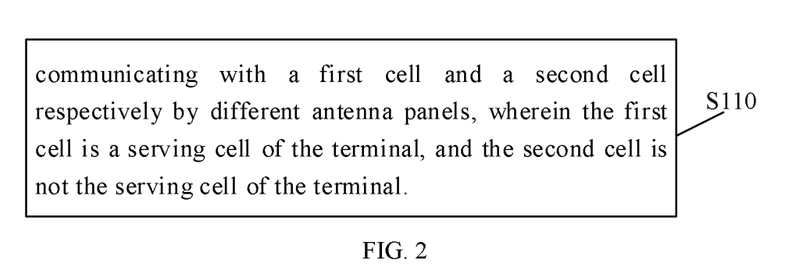
FIG. 2 is a schematic flowchart of a method for wireless communication according to an embodiment.

As shown in FIG. 2, the embodiment provides a method for wireless communication, which is applied to a terminal with a plurality of antenna panels. The method includes the step at S110.

At S110, different antenna panels are used to communicate with a first cell and a second cell respectively. The first cell is a serving cell of the terminal, and the second cell is not the serving cell of the terminal.

When the terminal has two or more antenna panels, the terminal may use different antenna panels to communicate with different cells through different connections.

In this embodiment of the disclosure, a terminal with a plurality of antenna panels may use different antenna panels to communicate with different cells. For example, the terminal may use different antenna panels simultaneously to communicate with the first cell and the second cell, respectively. The first cell may be a current serving cell of the terminal. The second cell may be a neighboring cell of the serving cell, but is not limited to a neighboring cell. The second cell may be a cell with which the terminal may communicate at the current location through the antenna panel. The second cell is a cell different from the first cell.

In this way, the terminal may use its own multi-antenna panel to communicate with a plurality of cells at the same time, so that the terminal located in an overlapping area of the plurality of cells may use different antenna panels to communicate with different cells, thus reducing a phenomenon where the communication effect is poor due to poor communication quality in a single serving cell when performing communication with a single serving cell, and ultimately improving the communication quality of the terminal.

For example, in some embodiments, the terminal may communicate with the first cell using one or more first antenna panels while one or more additional second antenna panels are used to communicate with the second cell.

Figure 3:
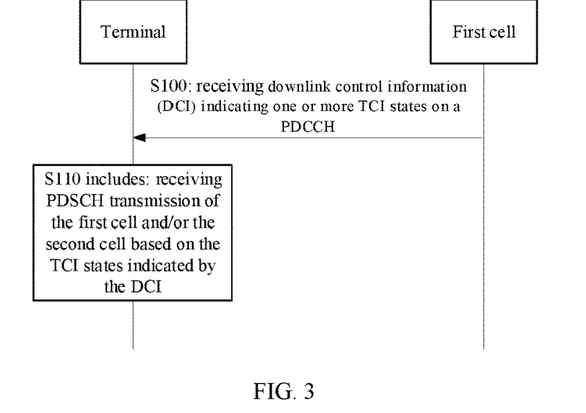
FIG. 3 is a schematic flowchart of another method for wireless communication according to an embodiment.

In some embodiments, the method further includes the step at S100.

At S100, downlink control information (DCI) is received on a physical downlink control channel (PDCCH). The DCI indicates one or more transmission configuration indication (TCI) states. The TCI state is configured to indicate at least one beam for transmitting a physical downlink shared channel (PDSCH), and one or more TCI states correspond to the first cell and/or the second cell.

At this time, the S110 may include: receiving PDSCH transmission of the first cell and/or the second cell based on the TCI states indicated by the DCI.

The TCI state is received on one PDCCH, and one PDCCH may belong to one cell.

In this embodiment of the disclosure, the PDCCH may be the PDCCH of the first cell. In some specific cases, the PDCCH on which the DCI indicating TCI states is sent may also be the PDCCH of the second cell.

The DCI for indicating TCI states received on one PDCCH of the first cell may be used to indicate one or more TCI states, and the TCI states may be used to indicate beams for PDSCH transmission.

The PDSCH transmission here is one of the communications between the terminal and the first cell and/or the second cell.

The antenna panel may include a reception panel for data reception and a transmission panel for data transmission.

In some embodiments, when the DCI indicates a plurality of TCI states, each of the TCI states corresponds to a different reception panel of the terminal, and different reception panels of the terminal use the plurality of TCI states indicated by the DCI to receive PDSCH data sent by a plurality of transceiver points (TRPs) or antenna panels for the serving cell, respectively.

In other embodiments, when the DCI indicates a plurality of TCI states, each of the TCI states corresponds to a different receiving panel of the terminal, and different receiving panels of the terminal use the plurality of TCI states indicated by the DCI to receive PDSCH data sent by a plurality of transceiver points (TRPs) or antenna panels for a neighboring cell respectively. The neighboring cell here is the aforementioned second cell.

In some embodiments, when the DCI indicates a plurality of TCI states, each of the TCI states corresponds to a different receiving panel of the terminal. For different receiving panels of the terminal that use the plurality of TCI states indicated by the DCI, some receiving panels are configured to receive the PDSCH data sent by the transceiver points (TRPs) or antenna panels for the serving cell through the corresponding TCI states, while other receiving panels are configured to receive the PDSCH data sent by the plurality of transceiver points (TRPs) or antenna panels for the neighboring cell through the corresponding TCI states. The neighboring cell here is the aforementioned second cell.

That is, the DCI may dynamically instruct a plurality of antenna panels of the terminal to receive the PDSCH data sent from the transceiver Points (TRPs) or antenna panels for the serving cell and/or the neighboring cell through the corresponding TCI states.

In this way, when the terminal receives the corresponding DCI, it may determine which beam to serve for the PDSCH transmission based on the TCI states indicated by the DCI. Further, the terminal may receive the PDSCH data from the first cell and/or the second cell through one or more reception beams on one or more antenna panels of the terminal based on the TCI states indicated by the DCI. The PDSCH data here is data transmitted by using the PDSCH, and the PDSCH data may include data and control signaling.

In some embodiments, time units corresponding to the plurality of TCI states are the same or different.

When the time units corresponding to the plurality of TCI states are the same, it means that the terminal simultaneously receives data from different beam transmission directions by using the reception beams corresponding to the plurality of TCI states, that is, time domain resources corresponding to the received data by using the plurality of TCI states are the same. For example, in the same slot or the same mini-slot, the serving cell transmits data to the terminal by using a beam transmission direction 1 of one antenna panel, while the neighboring cell also transmits data to the terminal by using a beam transmission direction 2 of another antenna panel. That is, in the same slot or the same mini-slot, the terminal needs to receive data from the serving cell by using a beam reception direction 1 of panel #1 in the terminal and receive data from the neighboring cell by using a beam reception direction 2 of panel #2 in the terminal at the same time. Here, the serving cell is the first cell, and the neighboring cell is the second cell.

The time units corresponding to the plurality of TCI states may also be different, and the received data corresponding to the beam reception directions for the plurality of TCI states are not transmitted at the same time. For example, the time occupied by the serving cell for transmitting data to the terminal through the beam transmission direction 1 of an antenna panel is slot #0, and specifically, the data needs to be received by the terminal through the beam reception direction 1 of antenna panel #1 in the terminal, for example. Further, the time occupied by the neighboring cell for transmitting data to the terminal through the beam transmission direction 2 of another antenna panel is slot #1, and the data needs to be received by the terminal through the beam reception direction 2 of antenna panel #2 in the terminal, for example.

In some embodiments, the time unit is mini-slot. The mini-slot may also be referred to as a micro slot. The mini-slot is smaller than the slot and may be a part of the slot. The mini-slot may include 1 to 14 symbols.

The mini-slots corresponding to the plurality of TCI states are in the same slot, or the mini-slots are distributed in a plurality of slots.

When the mini-slots corresponding to the plurality of TCI states are in the same slot, in this way, the time domain resources when the terminal communicates with the first cell and/or the second cell through different antenna panels may be in the same slot.

When the mini-slots corresponding to the plurality of TCI states are not in the same slot, in this way, the time-domain resources when the terminal communicates with the first cell and/or the second cell through the plurality of antenna panels are distributed in two or more slots.

In some embodiments, PDSCH data content transmitted in the time units corresponding to the plurality of TCI states is the same.

The PDSCH data content here is the same, but the redundancy versions (RV) of the PDSCH data transmitted in the time units corresponding to the plurality of TCI states may be different. In this way, on the one hand, the transmission diversity is obtained through repeated transmission, and on the other hand, redundancy increments through the different RVs are different, so that transmission in different TCI states may be used to ensure transmission quality.

In some embodiments, the method further includes: receiving TCI state configuration included in an RRC signaling. The TCI state configuration includes: a plurality of TCI states of the first cell and/or the second cell, and the TCI states indicated by the DCI are TCI states included in the TCI state configuration. The RRC here is an abbreviation of radio resource control.

In this embodiment of the disclosure, configuration for the plurality of TCI states of a terminal is completed by a high-layer signaling, for example, the RRC signaling. In this way, the terminal may receive the RRC signaling with the TCI state configuration.

In some embodiments, the TCI state configuration of the first cell and the TCI state configuration of the second cell may be included in different RRC signaling.

Alternatively, the TCI state configuration of the first cell and the TCI state configuration of the second cell may be included in the same RRC signaling.

Whether the TCI state configuration of the first cell and the TCI state configuration of the second cell are received through one RRC signaling or a plurality of RRC signaling may be determined according to the specific wireless communication environment and the communication state indicated by the current TCI state.

In some embodiments, the method further includes: receiving a medium access control (MAC) signaling. The MAC signaling is configured to activate one or more TCI states, and the activated TCI states correspond to the first cell and/or the second cell. The DCI indicates one or more TCI states in the TCI states activated by the MAC signaling.

The MAC signaling here may include two types. In a first type, the MAC signaling of the TCI state in the first cell or the second cell is independently activated. In a second type, the MAC signaling of the TCI state in the first cell and the second cell are activated at the same time.

It is assumed that M TCI states are configured through the RRC signaling, where M is a positive integer, but the M TCI states are not yet in an active state. That is, they are currently in an inactive state and have not yet taken effect. N of these TCI states may be activated through a MAC control element (CE) signaling, where N may be a positive integer less than M. After the TCI states are activated, the activated TCI states may be used to communicate with the cell based on the base station scheduling. That is, the TCI states indicated by the DCI signaling may only be one or more TCI states activated by the MAC signaling.

In some embodiments, receiving the MAC signaling for activating one or more TCI states includes: receiving the MAC signaling including a mapping relationship. The mapping relationship indicates a mapping relationship between serial numbers of TCI state combinations and TCI state combinations. One serial number of TCI state combination identifies one TCI state combination. The TCI state combination includes one or more TCI states.

The mapping relationship may exist in the form of a table, so that the mapping relationship table may be included in the MAC signaling.

In some embodiments, the MAC signaling may include an identifier of each TCI state, so that the TCI state is activated with a granularity being a single TCI state.

In some other embodiments, in addition to the identifier of each TCI state, the MAC signaling includes a mapping relationship, where the mapping relationship is a mapping relationship between serial numbers of TCI state combinations and TCI state combinations. For example, one TCI state combination may include a plurality of activated TCI states. The indication of TCI state combination is completed by carrying the serial number of TCI state combination with smaller bit overhead, which reduces the bit overhead of DCI.

Table 1 shows a correspondence between serial numbers of TCI state combinations and TCI states included in the TCI state combination.

TABLE 1

| serial numbers of TCI state combinations (ID) | serial numbers of TCI states included in the TCI state combination after renumbering |
|---|---|
| TCI state combination #0 | TCI#0 (the original serial number is TCI#i) |
| TCI state combination #1 | TCI#1 (the original serial number is TCI#j) |
| TCI state combination #2 | TCI#0 and TCI#1 (the original serial numbers are TCI#i and TCI#j) |
| ... | ... |
| ... | ... |
| TCI state combination #n | TCI#6 and TCI#7 (the original serial numbers are TCI#i+3 & TCI#j+11) |

In the above Table 1, i and j are 0 or any positive integer.

In some embodiments, the DCI includes a TCI state indication, and the TCI state indication includes the serial number of TCI state combination. The TCI state indication included in the DCI here may be the aforementioned serial number of TCI state combination. In this way, scheduling the TCI states included in the activated TCI state combination is completed through the DCI. The serial number of TCI state combination corresponds to one or more activated TCI states. And the activated TCI states need to be renumbered according to a size relationship of their original serial numbers. For example, the renumbered value of the TCI state with the smallest original serial number is TCI #0.

In some embodiments, the method may also distinguish the renumbered value of the activated TCI state of the first cell from that of the activated TCI state of the second cell. For example, the renumbered value of the TCI state of the first cell is smaller than that of the TCI state of the second cell. However, when one serial number of TCI state combination corresponds to a plurality of TCI states, each receiving antenna panel of the terminal corresponding to each TCI state is different.

In some embodiments, when the DCI indicates the TCI states, the indication granularity is a single TCI state in the TCI states activated by the MAC signaling. At this time, the TCI states activated by the MAC signaling may be renumbered. Table 2 is an illustration for renumbering a single TCI state.

TABLE 2

| original serial number of TCI state | renumbered value |
|---|---|
| TCI#i | TCI#0 |
| TCI#i+3 | TCI#1 |
| TCI#i+6 | TCI#2 |
| TCI#i+15 | TCI#3 |
| TCI#j | TCI#4 |
| TCI#j+2 | TCI#5 |
| TCI# j+7 | TCI#6 |
| TCI# j+11 | TCI#7 |

In some embodiments, the DCI includes a TCI state indication, and the TCI state indication includes a serial number after the activated TCI state is renumbered. For example, renumbering is performed based on a size relationship of original serial numbers. For example, the renumbered value of the TCI state with the smallest original serial number is TCI #0. The first cell and the second cell may also be distinguished, for example, the renumbered value of the TCI state of the first cell is smaller than that of the TCI state of the second cell.

In some embodiments, the method further includes: receiving a reference signal configuration for beam measurement, in which the reference signal configuration for beam measurement includes configuration of a reference signal for beam measurement sent by the second cell; performing beam measurement on the second cell based on the reference signal configuration for beam measurement; and reporting a measurement result of the beam measurement on the second cell to the first cell.

In the embodiment of the disclosure, a terminal located in a serving cell may not only receive the reference signal configuration sent by the first cell about beam measurement of the first cell, but also receive the reference signal configuration sent by the first cell about beam measurement of the second cell.

In this way, the terminal may measure the reference signals sent by the first cell and the second cell respectively according to the received beam reference signal configuration.

Here, the measurement result of the second cell is reported to the first cell, and at this time, the first cell may obtain the TCI state of the second cell according to the measurement result.

The TCI state is determined according to the measurement result of the reference signal. In other words, the beam measurement result of the second cell is used to determine the TCI state of the second cell. In this way, the first cell may know the TCI state of the second cell according to the measurement result of the reference signal of the second cell.

Figure 5:
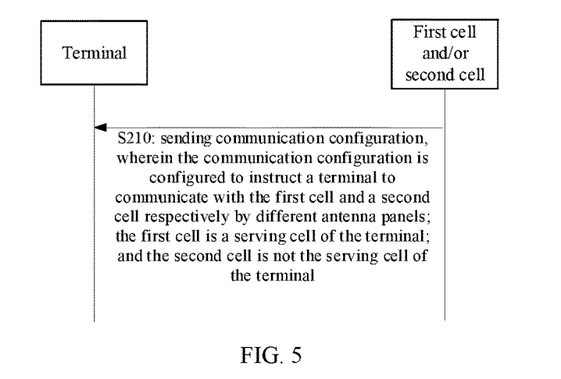
FIG. 5 is a schematic flowchart of yet another method for wireless communication according to an embodiment.

As shown in FIG. 5, an embodiment of the disclosure provides a method for wireless communication. The method is applied to a base station of a first cell. The method includes the step at S210.

At S210, communication configuration is sent. The communication configuration is configured to instruct a terminal to communicate with the first cell and a second cell respectively by different antenna panels. The first cell is a serving cell of the terminal. The second cell is not the serving cell of the terminal.

The communication configuration may include configuration information such as measurement configuration of reference signal for beam measurement or TCI states, etc., for controlling the terminal to communicate with the first cell and/or the second cell through different antenna panels.

In some embodiments, the communication configuration includes: sending a DCI indicating one or more TCI states on a PDCCH. The TCI state is configured to indicate at least one beam for transmitting a PDSCH, and the one or more TCI states correspond to the first cell and/or the second cell.

The TCI states indicated by the DCI here are communication configuration for scheduling the terminal to perform data transmission through one or more beams corresponding to the TCI states, and the data transmission includes but is not limited to PDSCH transmission. For example, when uplink communication and downlink communication are reciprocal, the beam corresponding to the TCI state may also be used for uplink transmission.

In some embodiments, the time units corresponding to the plurality of TCI states are the same or different.

In some embodiments, the time unit is mini-slot.

The mini-slots corresponding to the plurality of TCI states are in the same slot, or the mini-slots are distributed in the plurality of slots.

In some embodiments, PDSCH data content transmitted in the time units corresponding to the plurality of TCI states is the same.

In some embodiments, the method further includes: sending TCI state configuration included in a RRC signaling. The TCI state configuration includes: a plurality of TCI states for the first cell and/or the second cell, and the TCI states indicated by the DCI are TCI states included in the TCI state configuration.

The TCI state configuration is included in the RRC signaling.

In some embodiments, the method further includes: sending a MAC signaling. The MAC signaling is configured to activate one or more TCI states, and the activated TCI states correspond to the first cell and/or the second cell. The one or more TCI states indicated by the DCI are one or more TCI states among the TCI states activated by the MAC signaling.

One or more of the TCI states configured by the RRC signaling are activated through the MAC signaling.

In some embodiments, sending the MAC signaling for activating one or more TCI states includes: sending the MAC signaling including a mapping relationship. The mapping relationship indicates a mapping relationship between serial numbers of TCI state combinations and TCI state combinations. The serial number of TCI state combination identifies a TCI state combination. The TCI state combination includes: one or more TCI states.

The MAC signaling includes a mapping relationship between serial numbers of TCI state combinations and TCI states, so that the DCI signaling may directly indicate the serial number of TCI state combination, which may reduce unnecessary DCI signaling overhead.

In some embodiments, the DCI includes a TCI state indication, and the TCI state indication includes the serial number of TCI state combination.

In some other embodiments, the DCI includes a TCI state indication, and the TCI state indication includes serial numbers after renumbering the activated TCI states.

In some other embodiments, the method further includes: receiving reference signal configuration for beam measurement. The reference signal configuration for beam measurement includes: configuration of a reference signal for beam measurement sent by the second cell.

The configuration of the reference signal for beam measurement sent by the second cell may include: time-frequency resource configuration. In this way, the terminal receives the reference signal of the second cell on time-frequency resource indicated by the time-frequency resource configuration, thus completing the beam measurement of the reference signal of the second cell and reporting the measurement result to the first cell.

In some embodiments, the first cell may forward the measurement result reported by the terminal to the second cell, or the terminal may report by itself the measurement result of the second cell to the second cell.

In some embodiments, the method further includes: sending reference signal configuration for beam measurement. The reference signal configuration for beam measurement includes: configuration of the reference signal for beam measurement of the second cell.

Here, the reference signal configuration for beam measurement may be used by the terminal to perform beam measurement carrying the reference signal in the second cell, so as to obtain a measurement result of the beams in the second cell, and the measurement result may be used to determine the TCI states of the second cell.

An embodiment of the disclosure further provides a method for wireless communication. The method is applied to a base station of a second cell. The method includes: sending communication configuration of the second cell to a first cell. The second cell is a neighboring cell of the first cell. The communication configuration of the second cell is used for a terminal in the first cell to communicate with the first cell and the second cell respectively through different antenna panels.

The communication configuration may include: reference signal configuration for beam measurement and/or TCI state configuration of the second cell.

In some embodiments, the communication configuration of the second cell includes: TCI configuration of the second cell, in which the TCI configuration of the second cell includes: configuration of one or more TCI states in the second cell; and/or, reference signal configuration for beam measurement of the second cell.

For example, the method for wireless communication according to the example may include the following steps:
sending by the first cell, a request for reference signal configuration for beam measurement to the second cell;
sending by the second cell, the reference signal configuration for beam measurement to the first cell based on the received request, sending by the first cell, the reference signal configuration for beam measurement of the second cell to the terminal;
obtaining by the terminal, a measurement result based on the reference signal configuration for beam measurement of the second cell and a signal strength of the received reference signal;
measuring and reporting by the terminal, the result of the beam measurement of the second cell to the first cell;

selecting by the first cell, an appropriate TCI state of the second cell to form a TCI state configuration, and sending a RRC signaling, a MAC signaling, and DCI configuration including TCI state configuration to the terminal, and configuring the appropriate TCI state of the first cell to the terminal.

The first cell notifies a terminal in the second cell to receive a TCI state used by data of the second cell, and the second cell sends data for the terminal by using a transmission beam of the second cell corresponding to the TCI state.

The terminal receives PDSCH data of the first cell and the second cell respectively by using a plurality of TCI states.

Figure 6:
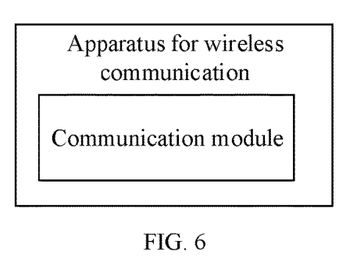
FIG. 6 is a block diagram of an apparatus for wireless communication according to an embodiment.

As shown in FIG. 6, this embodiment provides an apparatus for wireless communication, which is applied to a terminal with a plurality of antenna panels. The apparatus includes a communication module.

The communication module is configured to communicate with a first cell and a second cell respectively by different antenna panels, in which the first cell is a serving cell of the terminal, and the second cell is not the serving cell of the terminal.

In some embodiments, the communication module may be a program module.

When the program module is executed by a processor, the terminal is enabled to communicate with the first cell and the second cell respectively by different antenna panels.

For example, a part of the antenna panels in the terminal are used to communicate with the first cell, and another part of the antenna panels in the terminal are used to communicate with the second cell.

In some other embodiments, the communication module may be a combination of hardware and software modules, and the combination of hardware and software modules may include a programmable array. The programmable array includes a complex programmable array or a field programmable array.

In some other embodiments, the communication module may be a pure hardware module, which may include an application specific integrated circuit.

In some embodiments, the apparatus for wireless communication may further include: a storage module which may store information for controlling the terminal to communicate with the first cell and the second cell respectively through the plurality of antenna panels.

In some embodiments, the apparatus further includes a downlink control information (DCI) module.

The DCI module is configured to receive DCI indicating one or more transmission configurations indication (TCI) states on a physical downlink control channel (PDCCH), in which the TCI state is configured to indicate at least one beam for transmitting a physical downlink shared channel (PDSCH), the one or more TCI states correspond to the first cell and/or the second cell.

In some embodiments, time units corresponding to the TCI states are the same or different.

In some embodiments, the time unit is mini-slot.

The mini-slots corresponding to the TCI states are in the same slot, or the mini-slots are distributed in a plurality of slots.

In some embodiments, PDSCH data content transmitted in time units corresponding to the TCI states are the same.

In some embodiments, the apparatus further includes a radio resource control (RRC) module.

The RRC module is configured to receive TCI state configuration included in a RRC signaling, in which the TCI state configuration includes: a plurality of TCI states for the first cell and/or the second cell, and the TCI states indicated by the DCI are TCI states included in the TCI state configuration.

In some embodiments, the apparatus further includes: a media access control (MAC) module.

The MAC module is configured to receive a MAC signaling, in which the MAC signaling is configured to activate one or more TCI states, and the activated TCI states correspond to the first cell and/or the second cell; the DCI is configured to indicate one or more TCI states in the TCI states activated by the MAC signaling.

In some embodiments, the MAC module is configured to receive the MAC signaling including a mapping relationship, in which a TCI state combination is identified by a serial number of TCI state combination, and the TCI state combination includes: one or more TCI states.

In some embodiments, the MAC signaling includes a mapping relationship table. One or more of the mapping relationships are included in the mapping relationship table.

In some embodiments, the DCI includes a TCI state indication, and the TCI state indication includes the serial number of TCI state combination.

In some other embodiments, the DCI includes a TCI state indication, and the TCI state indication includes serial numbers after renumbering the activated TCI states.

In some embodiments, the apparatus further includes: a first receiving module, a measurement module and a reporting module.

The first receiving module is configured to receive reference signal configuration for beam measurement, in which the reference signal configuration includes: configuration of a reference signal for beam measurement sent by the second cell.

The measurement module is configured to perform beam measurement on the second cell based on the reference signal configuration for beam measurement.

The reporting module is configured to report a measurement result of the beam measurement on the second cell to the first cell.

Figure 7:
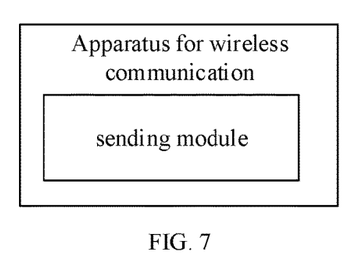
FIG. 7 shows a block diagram of an apparatus for wireless communication according to another embodiment.

As shown in FIG. 7, the embodiment provides an apparatus for wireless communication, which is applied to a base station of a first cell. The apparatus includes: a sending module.

The sending module is configured to send communication configuration. The communication configuration is configured to instruct a terminal to communicate with the first cell and a second cell respectively by different antenna panels; the first cell is a serving cell of the terminal; and the second cell is not the serving cell of the terminal. In some embodiments, the sending module may be a program module. When the program module is executed by a processor, the communication configuration may be sent.

In some other embodiments, the sending module may be a software-hardware combination module, and the software-hardware combination module may include a programmable array. The sending module column include a complex programmable array or a field-programmable array.

In some other embodiments, the communication module may be a pure hardware module, which may include an application specific integrated circuit.

In some embodiments, the apparatus for wireless communication may further include a storage module in which the communication configuration may be stored.

In some embodiments, the communication configuration includes: sending downlink control information (DCI) indicating one or more transmission configurations indication (TCI) states on a physical downlink control channel (PDCCH), in which the TCI state is configured to indicate at least one beam for transmitting a physical downlink shared channel (PDSCH), the one or more TCI states correspond to the first cell and/or the second cell.

In some embodiments, time units corresponding to the TCI states are the same or different.

In some embodiments, the time unit is mini-slot.

The mini-slots corresponding to the TCI states are in the same slot, or the mini-slots are distributed in a plurality of slots.

In some embodiments, PDSCH data content transmitted in time units corresponding to the TCI states is the same.

In some embodiments, the sending module is further configured to send TCI state configuration included in a radio resource control (RRC) signaling, in which the TCI state configuration includes: a plurality of TCI states for the first cell and/or the second cell, and the TCI states indicated by the DCI are TCI states included in the TCI state configuration.

In some embodiments, the sending module is further configured to send a medium access control (MAC) signaling, in which the MAC signaling is configured to activate one or more TCI states, and the activated TCI states correspond to the first cell and/or the second cell; the DCI is configured to indicate one or more TCI states in the TCI states activated by the MAC signaling.

In some embodiments, the sending module is configured to send the MAC signaling including a mapping relationship, in which a TCI state combination is identified by a serial number of TCI state combination, and the TCI state combination includes: one or more TCI states.

In some embodiments, the DCI includes a TCI state indication, and the TCI state indication includes the serial number of TCI state combination.

In other embodiments, the DCI includes a TCI state indication, and the TCI state indication includes serial numbers after renumbering the activated TCI states.

In some embodiments, the apparatus further includes: a second receiving module.

The second receiving module is configured to receive reference signal configuration for beam measurement of the second cell, in which the reference signal configuration includes: configuration of a reference signal for beam measurement sent by the second cell.

In some embodiments, the sending module is configured to send reference signal configuration for beam measurement, in which the reference signal configuration includes: configuration of the reference signal for beam measurement of the second cell.

In some embodiments, the second receiving module is further configured to receive a measurement result of the second cell sent by the terminal.

The embodiment of the disclosure proposes a method of a terminal performing beam measurement and beam reporting for a second cell, thus enabling dynamic switching among a plurality of panels for a plurality of cells to transmit data to the terminal and improving terminal throughput. The second cell here may be any cell other than the current serving cell of the terminal, for example, a neighboring cell of the serving cell or a cell with other network types within the serving cell.

The terminal obtains the reference signal configuration for beam measurement, which includes a plurality of methods.

The base station to which the second cell belongs, sends the reference signal configuration for beam measurement to a serving base station to which the first cell of the terminal belongs. The serving base station then sends the reference signal configuration for beam measurement to the terminal.

A plurality of TCI states are transmitted to the terminal on the same PDCCH. Here, the TCI states are used for beam indication of downlink PDSCH reception, and the plurality of TCI states correspond to the same cell or different cells.

The plurality of TCI states correspond to the same time unit, or different time units. Corresponding to the same time unit means that the terminal uses the plurality of TCI states to simultaneously receive data.

Corresponding to different time units means that the terminal uses different TCI states to receive data at different times.

When the corresponding time units are different, the plurality of time units may all be mini-slots, the plurality of time units are in the same slot, and a plurality of time units may also be a plurality of slots.

The data content transmitted in the plurality of time units may be the same, i.e., sending repeatedly to improve reliability. The data content may also be different to improve throughput.

Since the DCI state may indicate a plurality of TCI states, which may be the same cell or different cells, a plurality of TCI states (such as 128 or 64 TCI states) need to be configured for different cells when configuring the TCI state for the terminal by the RRC state.

The TCI states activated by the MAC signaling are N TCI states among the plurality of TCI states configured by the RRC signaling, for example, N is equal to 8 or 16. The TCI states activated by the MAC signaling need to include the TCI states of different cells at the same time.

The MAC signaling may also include a correspondence between TCI state combinations and one or more TCI states activated by the MAC. For example, 8 TCI states are activated, the first cell corresponds to TCI #i, TCI #i+3, TCI #i+6 and TCI #i+15, and the second cell corresponds to TCI #j, TCI #j+2, TCI #j+7 and TCI #j+11. The correspondence between TCI combinations and one or more TCI states is shown in the above Table 1.

The DCI indicates TCI states:

The DCI may indicate the TCI states corresponding to the renumbered values of the MAC-activated TCI states, for example, a plurality of MAC-activated TCI states are firstly grouped and sorted according to the cells.

For example, the TCI state serial number of the first cell is at the front, and the TCI state serial number of the second cell is at the back. Numbering is then performed according to the TCI state ID in each cell, and a new serial number is still smaller after the TCI state with a smaller original serial number is renumbered. After the plurality of TCI states are renumbered, new serial numbers are as shown in the above Table 2. In some embodiments, the second cell may include: a target cell to be accessed by the terminal.

That is, the DCI state directly corresponds to the new serial number after renumbering. For example, when the DCI is 3 bits, "000" corresponds to the renumbered TCI #0, "001" corresponds to the renumbered TCI #1, . . . , "111" corresponds to the renumbered TCI #7. The details may refer to the above Table 2.

a) the DCI may also correspond to the TCI state combination ID in the mapping table given by the MAC signaling, for example, "000" identifies a TCI state corresponding to the TCI state combination #0, "001" identifies a TCI state corresponding to the TCI state combination #1, . . . , "111" identifies a TCI state corresponding to the TCI state combination #7.

b) The number of bits used by the DCI to indicate the TCI states may be 3 bits or 4 bits or more, which is determined based on the TCI states activated by the MAC and whether the MAC signaling includes a mapping relationship between the TCI state combinations and one or more TCI states.

For example, when the number of TCI states activated by the MAC signaling is large, the number of bits used by the DCI to indicate the TCI states is large; when the MAC signaling indicates a mapping relationship between TCI state combinations and one or more TCI states, the number of bits used by the DCI to indicate the TCI states is small.

Figure 8:
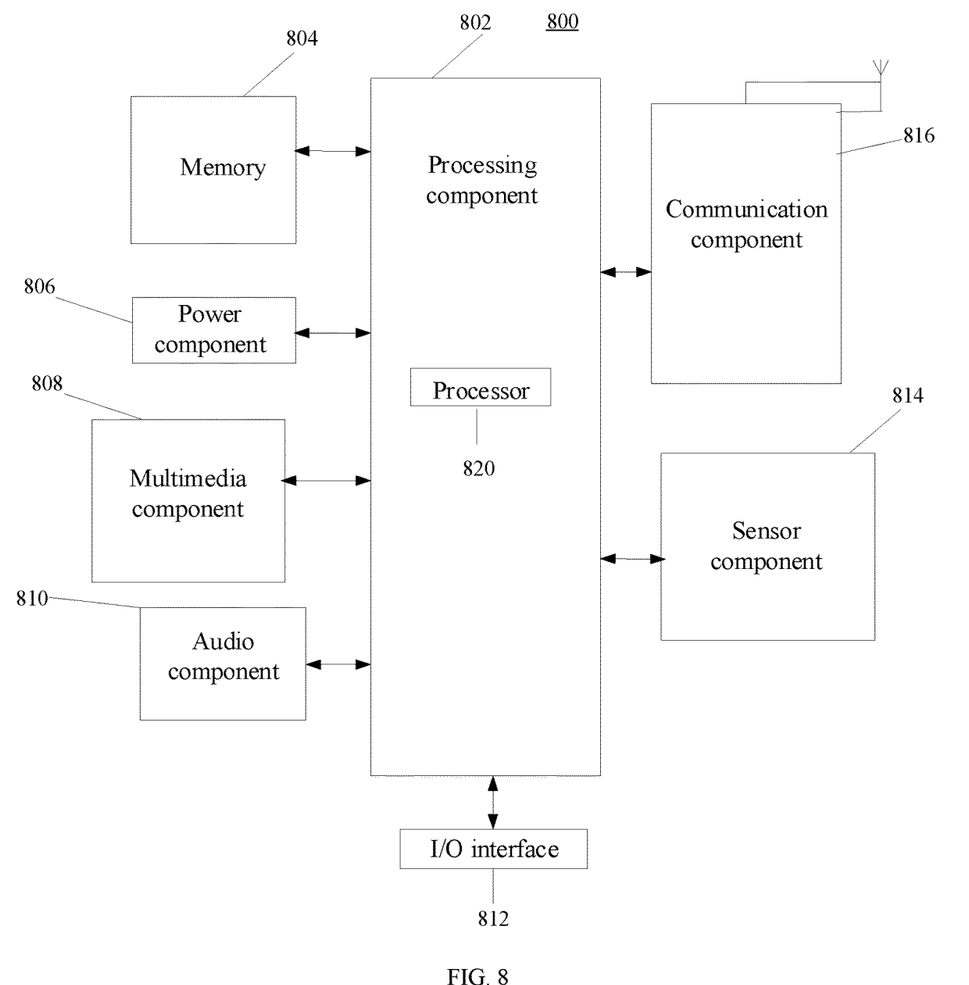
FIG. 8 is a block diagram of an apparatus for wireless communication according to another embodiment.

FIG. 8 is a block diagram of a device 800 for wireless communication according to an embodiment. For example, the device 800 may be a terminal, which may be a mobile phone, a computer, a digital broadcast terminal, a messaging device, a game console, a tablet device, a medical device, a fitness device, a personal digital assistant, or the like.

Device 800 is an example of device 110, FIG. 1.

As illustrated in FIG. 8, the device 800 may include one or more of the following components: a processing component 802, a memory 804, a power component 806, a multimedia component 808, an audio component 810, an input/output (I/O) interface 812, a sensor component 814, and a communication component 816.

The processing component 802 generally controls overall operations of the device 800, such as the operations associated with display, phone calls, data communications, camera operations, and recording operations. The processing component 802 may include one or more processors 820 to execute instructions to perform all or some of the steps of the methods described above. Moreover, the processing component 802 may include one or more modules that facilitate interactions between the processing component 802 and other components. For example, the processing component 802 may include a multimedia module to facilitate interactions between the multimedia component 808 and the processing component 802.

The memory 804 is configured to store various types of data to support operation of the device 800. Examples of such data include instructions for any application or method operating on the device 800, contact data, phonebook data, messages, pictures, videos, and the like. The memory 804 may be implemented by any type of volatile or nonvolatile storage device or their combination, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 provides power to various components of the device 800. The power component 806 may include a power management system, one or more power sources, and any other components associated with the generation, management, and distribution of power in the device 800.

The multimedia component 808 includes a screen providing an output interface between the device 800 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 808 includes a front-facing camera and/or a rear-facing camera. When the device 800 is in an operating mode, such as a shooting mode or a video mode, the front-facing camera and/or the rear-facing camera can receive external multimedia data. Each front-facing camera and rear-facing camera may be a fixed optical lens system or has focal length and optical zoom capability.

The audio component 810 is configured to output and/or input audio signals. For example, the audio component 810 includes a microphone (MIC) that is configured to receive external audio signals when the device 800 is in an operating mode, such as a call mode, a recording mode, and a voice recognition mode. The received audio signal may be further stored in the memory 804 or transmitted via the communication component 816. In some embodiments, the audio component 810 also includes a speaker for outputting audio signals.

The I/O interface 812 provides an interface between the processing component 802 and peripheral interface modules, such as a keyboard, a click wheel, buttons, and the like. The buttons may include, but are not limited to, a home button, a volume button, a starting button, and a locking button.

The sensor component 814 includes one or more sensors to provide status assessments of various aspects of the device 800. For instance, the sensor component 814 may detect an open/closed status of the device 800, relative positioning of components, e.g., the display and the keypad, of the device 800, a change in position of the device 800 or a component of the device 800, a presence or absence of user contact with the device 800, an orientation or an acceleration/deceleration of the device 800, and a change in temperature of the device 800. The sensor component 814 may include a proximity sensor configured to detect the presence of nearby objects without any physical contact. The sensor component 814 may also include a light sensor, such as a CMOS or CCD image sensor, for use in imaging applications. In some embodiments, the sensor component 814 may also include an accelerometer sensor, a gyroscope sensor, a magnetic sensor, a pressure sensor, or a temperature sensor.

The communication component 816 is configured to facilitate communication, wired or wirelessly, between the device 800 and other devices. The device 800 can access a wireless network based on a communication standard, such as WiFi, 2G, or 3G, or their combination. In an embodiment, the communication component 816 receives a broadcast signal or broadcast associated information from an external broadcast management system via a broadcast channel. In an embodiment, the communication component 816 further includes a near field communication (NFC) module to facilitate short-range communications. For example, the NFC module may be implemented based on a radio frequency identity (RFID) technology, an infrared data association (IrDA) technology, an ultra-wideband (UWB) technology, a Bluetooth (BT) technology, and other technologies.

In embodiments, the device 800 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described method.

In embodiments, there is also provided a non-transitory computer readable storage medium including instructions, such as included in the memory 804, executable by the processor 820 in the device 800, for performing the above method. For example, the non-transitory computer-readable storage medium may be a ROM, a RAM, a CD-ROM, a magnetic tape, a floppy disc, an optical data storage device, and the like.

Figure 4:
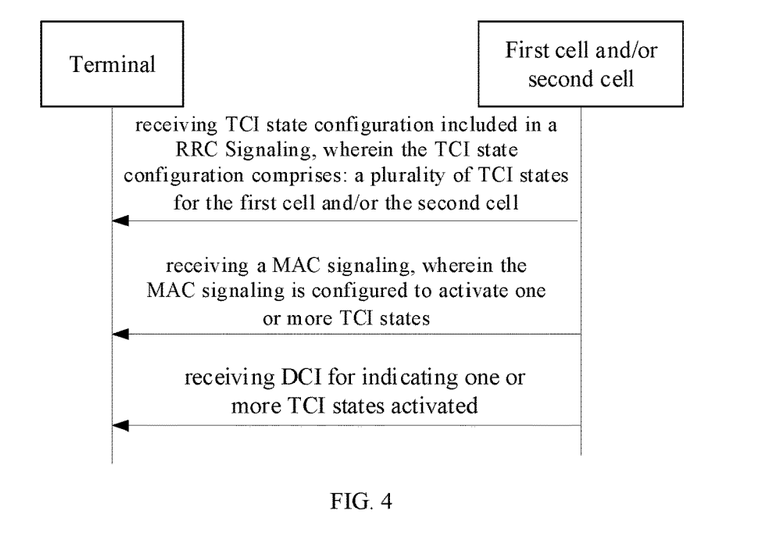
FIG. 4 is a schematic flowchart of yet another method for wireless communication according to an embodiment.

A non-transitory computer-readable storage medium is provided. When instructions in the storage medium are executed by a processor of a mobile terminal, the mobile terminal is enabled to execute a method for wireless communication, the method may be as shown in FIG. 2 to FIG. 4.

Figure 9:
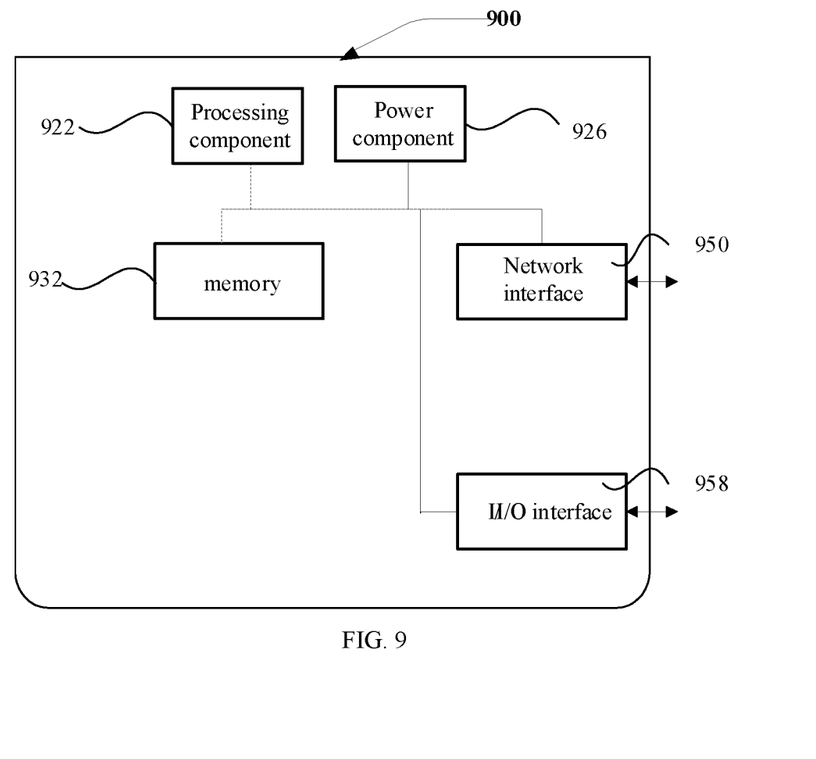
FIG. 9 is a block diagram of an apparatus for wireless communication according to another embodiment.

FIG. 9 is a block diagram of a device 900 for wireless communication according to an embodiment. For example, the device 900 may be provided as a base station. As illustrated in FIG. 9, the device 900 includes a processing component 922, which further includes one or more processors, and a memory resource represented by a memory 932, for storing instructions executable by the processing component 922, such as an application program. The application program stored in the memory 932 may include one or more modules, each corresponding to a set of instructions. Additionally, the processing component 922 is configured to execute instructions to perform the method for wireless communications shown in FIG. 2 to FIG. 5.

The device 900 may also include a power supply assembly 926 configured to perform power management of the device 900, a wired or wireless network interface 950 configured to connect the device 900 to a network, and an input output (I/O) interface 958. The device 900 may operate based on an operating system stored in the memory 932, such as Windows Server™, Mac OS X™, Unix™, Linux™, FreeBSD™ or the like.

In an embodiment, there is also provided a device for wireless communication, which includes a processor, a memory, and an executable program stored on the memory and capable of being run by the processor. When the program is executed, the processor is caused to execute the method for wireless communication according to any technical solution, for example, at least one of the methods shown in FIG. 2 to FIG. 5.

The processor may be implemented by one or more application specific integrated circuit (ASIC), a DSP, a programmable logic device (PLD), a complex programmable logic device (CPLD), a field-programmable gate array (FPGA), a general-purpose processor, a controller, a micro controller unit (MCU), a microprocessor or other electronic components to perform the above methods.

In an embodiment, there is also provided a non-transitory computer-readable storage medium having an executable program stored. When the executable program is executed by a processor, the method for wireless communication according to any technical solution is implemented, for example, at least one of the methods shown in FIG. 1 to FIG. 5.

Those skilled in the art will be aware of other embodiments of the disclosure after considering the specification and practicing the disclosure disclosed herein. The disclosure is intended to cover any variations, uses, or adaptive changes of the disclosure, which follow the general principles of the disclosure and include common knowledge or conventional technical means in the technical field not disclosed herein. The description and the embodiments are to be regarded as exemplary, and the true scope and spirit of the disclosure are indicated in the following claims.

It may be appreciated that the disclosure is not limited to the exact construction that has been described above and illustrated in the accompanying drawings. It is intended that the scope of the disclosure only be limited by the appended claims.

What is claimed is:

1. A method for wireless communication, performed by a terminal with a plurality of antenna panels, the method comprising:
communicating with a first cell and a second cell by respective antenna panels of the plurality of antenna panels through different connections, wherein the first cell is a serving cell of the terminal, and the second cell is a cell other than the serving cell of the terminal; and
receiving downlink control information (DCI) included in a signaling on a physical downlink control channel (PDCCH), wherein the DCI is configured to indicate one or more transmission configuration indication (TCI) states, each of the TCI states is configured to indicate at least one beam for transmitting a physical downlink shared channel (PDSCH), and the one or more TCI states correspond to at least one of the first cell and the second cell; wherein
mini-slots corresponding to the TCI states are in one slot;
receiving reference signal configuration, wherein the reference signal configuration includes configuration of a reference signal for beam measurement sent by the second cell;
performing beam measurement on the second cell based on the reference signal configuration; and
reporting a result of the beam measurement on the second cell to the first cell;
sending a measurement result for the reference signal of the second cell sent by the terminal; so that a base station of the first cell selects an appropriate TCI state of the second cell to form a TCI state configuration based on the measurement result for the reference signal of the second cell; and
receiving a TCI state configuration of the second cell to the terminal, wherein the TCI state configuration of the second cell comprises: a plurality of TCI states for the second cell.

2. The method of claim 1, wherein PDSCH data content transmitted in each of time units corresponding to the TCI states is identical.

3. The method of claim 1, wherein the signaling is a radio resource control (RRC) signaling, the method further comprises:
receiving TCI state configuration included in the RRC signaling, wherein the TCI state configuration comprises the TCI states indicated by the DCI.

4. The method of claim 1, further comprising:
receiving a media access control (MAC) signaling, wherein the MAC signaling is configured to activate one or more TCI states, and the activated TCI states correspond to at least one of the first cell and the second cell; the DCI includes one or more of the TCI states activated by the MAC signaling.

5. The method of claim 4, wherein,
the DCI includes a TCI state indication, and the TCI state indication includes serial numbers after renumbering the activated TCI states.

6. The method of claim 1, the configuration of the reference signal for beam measurement sent by the second cell comprises: time-frequency resource configuration.

7. A method for wireless communication, performed by a base station of a first cell, the method comprising:
sending communication configuration, wherein the communication configuration is configured to instruct a terminal to communicate with the first cell and a second cell by respective antenna panels through different connections; the first cell is a serving cell of the terminal; and the second cell is a cell other than the serving cell of the terminal; and sending downlink control information (DCI) included in a signaling on a physical downlink control channel (PDCCH), wherein the DCI is configured to indicate one or more transmission configuration indication (TCI) states, each of the TCI states is configured to indicate at least one beam for transmitting a physical downlink shared channel (PDSCH), the one or more TCI states correspond to at least one of the first cell and the second cell; wherein mini-slots corresponding to the TCI states are in one slot;

further comprising:

receiving reference signal configuration from the second cell, wherein the reference signal configuration includes configuration of a reference signal for beam measurement sent by the second cell;

sending the reference signal configuration to the terminal;

receiving a result of the beam measurement on the second cell sent by the terminal;

receiving a measurement result for the reference signal of the second cell sent by the terminal; selecting an appropriate TCI state of the second cell to form a TCI state configuration based on the measurement result for the reference signal of the second cell;

sending the TCI state configuration of the second cell to the terminal, wherein the TCI state configuration of the second cell comprises: a plurality of TCI states for the second cell; and sending the plurality of TCI states of the second cell received by the terminal to the second cell.

8. The method of claim 7, wherein PDSCH data content transmitted in each of time units corresponding to the TCI states is identical.

9. The method of claim 7, wherein the signaling is a radio resource control (RRC) signaling, the method further comprises:

sending TCI state configuration included in the RRC signaling, wherein the TCI state configuration comprises the TCI states indicated by the DCI.

10. The method of claim 7, further comprising:

sending a medium access control (MAC) signaling, wherein the MAC signaling is configured to activate one or more TCI states, and the activated TCI states correspond to at least one of the first cell and the second cell; the DCI is configured to indicate one or more of the TCI states activated by the MAC signaling.

11. The method of claim 10, wherein, the DCI includes a TCI state indication, and the TCI state indication includes serial numbers after renumbering the activated TCI states.

12. The method of claim 7, the configuration of the reference signal for beam measurement sent by the second cell comprises: time-frequency resource configuration.

13. A base station of a first cell, comprising: a processor; a transceiver connected to the processor; and a memory connected to the processor and storing computer-readable instructions that when executed by the processor, control the processor to perform the method of claim 7.

14. A terminal with a plurality of antenna panels, comprising:

a processor;

a transceiver connected to the processor;

a memory connected to the processor and storing computer-readable instructions that when executed by the processor, control the processor to:

communicate with a first cell and a second cell respectively by different antenna panels through different connections, wherein the first cell is a serving cell of a terminal, and the second cell is a cell other than the serving cell of the terminal; and receive downlink control information (DCI) included in a signaling on a physical downlink control channel (PDCCH), wherein the DCI is configured to indicate one or more transmission configuration indication (TCI) states, each of the TCI states is configured to indicate at least one beam for transmitting a physical downlink shared channel (PDSCH), and the one or more TCI states correspond to at least one of the first cell and the second cell; wherein mini-slots corresponding to the TCI states are in one slot;

receive reference signal configuration, wherein the reference signal configuration includes configuration of a reference signal for beam measurement sent by the second cell;

perform beam measurement on the second cell based on the reference signal configuration;

report a result of the beam measurement on the second cell to the first cell;

send a measurement result for the reference signal of the second cell sent by the terminal; so that a base station of the first cell selects an appropriate TCI state of the second cell to form a TCI state configuration based on the measurement result for the reference signal of the second cell; and receive a TCI state configuration of the second cell to the terminal, wherein the TCI state configuration of the second cell comprises: a plurality of TCI states for the second cell.

15. The terminal of claim 14, wherein the signaling is a radio resource control (RRC) signaling, the processor is configured to: receive TCI state configuration included in the RRC signaling, wherein the TCI state configuration comprises the TCI states indicated by the DCI.

16. The terminal of claim 14, the processor is further controlled to:

receive reference signal configuration, wherein the reference signal configuration includes configuration of a reference signal for beam measurement sent by the second cell;

perform beam measurement on the second cell based on the reference signal configuration; and report a result of the beam measurement on the second cell to the first cell.

17. The terminal of claim 16, the configuration of the reference signal for beam measurement sent by the second cell comprises: time-frequency resource configuration.

* * * * *